United States Patent [19]

Stauss

[11] Patent Number: 4,478,857
[45] Date of Patent: Oct. 23, 1984

[54] PROCESS OF MAKING SHELF STABLE, NUTRIENT FORTIFIED CEREAL BASED FOOD

[75] Inventor: Kirk B. Stauss, Spirit Lake, Iowa

[73] Assignee: Global Nutrameal, Inc., Spirit Lake, Iowa

[21] Appl. No.: 479,258

[22] Filed: Mar. 28, 1983

[51] Int. Cl.$^3$ .................... A23L 1/30; A21D 2/00
[52] U.S. Cl. .................... 426/72; 426/449; 426/450; 426/549; 426/618
[58] Field of Search .............. 426/448, 449, 450, 516, 426/549, 618, 463, 72

[56] References Cited

U.S. PATENT DOCUMENTS

| | | | |
|---|---|---|---|
| 2,282,788 | 5/1942 | Musher | 426/72 |
| 2,421,216 | 5/1947 | Penty | 426/621 |
| 2,590,647 | 3/1952 | Pettibone | 426/577 |
| 2,774,670 | 12/1956 | Albert | 426/72 |
| 2,831,770 | 4/1958 | Antoshkiw | 426/72 |
| 3,054,677 | 9/1962 | Graham et al. | 426/448 |
| 3,458,321 | 7/1969 | Reinhart et al. | 426/448 |
| 3,480,442 | 11/1969 | Atkinson | 426/448 |
| 3,851,081 | 11/1974 | Epstein | 426/448 |
| 3,857,977 | 12/1974 | Huessy | 426/622 |
| 4,020,187 | 4/1977 | McCulloch et al. | 426/72 |
| 4,032,668 | 6/1977 | Jones et al. | 426/449 |
| 4,057,656 | 11/1977 | Spiel | 426/629 |
| 4,119,734 | 10/1978 | Spiel | 426/72 |

*Primary Examiner*—George Yeung
*Attorney, Agent, or Firm*—Zarley, McKee, Thomte, Voorhees & Sease

[57] ABSTRACT

A process of making a long shelf life, nutrient fortified cereal based food which has a high degree of flexibility of bulk shape form and flavor to allow confirmation to a variety of worldwide ethnic eating habits. The cereal grains are a mixture of corn and soybeans, milled to a fine flour which is then vitamin and mineral fortified to a level in excess of the recommended daily requirements allowances, the flour is moistened to achieve a moisture level of from about 17% to 20% and thereafter cooker extruded wherein gelatinization occurs, followed by shaping and drying.

5 Claims, No Drawings

PROCESS OF MAKING SHELF STABLE, NUTRIENT FORTIFIED CEREAL BASED FOOD

BACKGROUND OF THE INVENTION

For many years people have attempted to achieve a shelf stable, nutrient fortified cereal based food which has the flexibility of being shaped and flavored to allow confirmation to a wide variety of ethnic eating habits. Such a product if successfully achieved, would offer tremendous potential for diet supplementation, particularly in the poverty areas of the world.

Food products from countries such as the United States having excesses of cereal grains are a highly likely candidate for achieving the "universal cereal food product goal". However, as is well known, there is more of a problem than simply providing an available food product.

The eating habits in various countries, and even in various parts of countries, differ considerably. For example, in some parts of the world, rice is a staple, others soybeans, others corn, others meat, and still others fish. In each of these ethnic areas, in spite of a real and continuing nutritional need, the people are reluctant to use a food product which does not conform to their indigenous lifestyle. Thus, for example, in some countries where the people are totally familiar with rice as a staple of their diet, the people will not willingly and readily accept other cereal based foods, in spite of their nutritional value. They desire the look, taste, feel and shape of rice. Likewise, where fish is the important staple of the diet, anything else is not readily accepted. And so it goes.

It can be seen that while there is a continuing need for nutrition, there is also a necessity to conform to the indigenous lifestyle eating habits.

This invention has as its primary objective the development of a cereal based food product which has long shelf life so that it can be shipped and be stable for up to one year after shipment, which is nutrient fortified to provide a U.S. recommended daily allowance of minerals and vitamins, and which desirably has the flexibility to allow conformation of shape, form and flavor to a variety of ethnic habits.

Importantly, another objective of the invention is to provide a cereal based food which can be made from a combination of corn and soybeans, both grains which are in substantial excess in the United States.

Yet another objective of the present invention is to provide a cereal based food product which is "over fortified" so that there is a built-in compensation for nutrient and mineral loss during cooking. As a result, the end product after cooking still contains the U.S. recommended daily allowance minimum requirements.

Another objective of the present invention is to provide a product which in spite of its high soybean content, does not have the characteristic soy or beany bitter flavor, but in contrast, can be flavored as desired.

A still further objective of the present invention is to prepare a product which is made from a mixture of corn and soybeans, with the whole kernel and the whole soybean being utilized, that is, without dehulling, degerming, or defatting.

Other objectives will become apparent from the detailed description of the invention which follows.

SUMMARY OF THE INVENTION

Whole corn and whole soybeans, the weight ratio of corn to soybeans being from about 65:35 to about 70:30, are milled to provide a flour mixture, which is thereafter fortified, moistened, flavor added, followed by extruder cooking to cook and gelatinize. Finally, the product is shaped and dried. A critical ratio of corn to soybeans is utilized such that no special steps are required to mask or remove the flavors of either, with the resulting flour being a substantially "neutral" flavored flour which is highly processible, giving rise to great flexibility.

DETAILED DESCRIPTION OF THE INVENTION

In accordance with the preparation of the cereal based food product of this invention, a mixture of whole corn kernels and whole soybeans are prepared. The corn to soybean weight ratio in the mixture is from about 65:35 to about 70:30. It is important that the weight ratios be within the range specified. It has been found that if the weight ratios are within this range, one can prepare a product which is substantially neutral in taste and therefore suitable to allow ultimate confirmation to a wide variety of ethnic taste preferences. The ratios have been selected to provide a proper protein balance in conformity with United States recommended daily allowances for a balanced and nutritional diet. In addition, they provide a mixture which is not only substantially neutral in flavor, but highly processible. If greater amounts of soybeans are used, the soybean oil which is present begins to cause processing difficulties. Conversely, if greater amounts of corn are used, there is a sacrifice in the required protein content.

It is important to note that the mixture is of whole kernel corn and whole soybeans. If one utilizes the weight ratio specified herein, there is no advantage in dehulling or degerming or defatting the soybeans. In fact, some disadvantages are achieved if these extra and expensive processing steps are employed. Thus, one advantage of the invention is that one can use field corn and field soybeans, as is.

After thorough intimate mixing of the corn and soybeans, within the weight ratios previously specified, the mixed grains are then roller/hammer milled to provide a flour. The flour must be sufficiently fine to allow extrusion processing in subsequent tests. In addition, the milling has a definite effect upon flavor and taste. Generally, it has been found highly advantageous to have a mixed flour which is roller/hammer milled to provide a sufficiently fine flour that it will pass through a 20 mesh U.S. Standard sieve screen and preferably through a 30 mesh U.S. standard sieve screen. When the through 20-30 U.S. mesh standard sieve screen state of subdivision is achieved, the flour is of sufficient fineness to allow easy extrusion processing in subsequent steps, and in addition, is in a sufficient state of subdivision to minimize taste of either the corn or soy. Coarser flours are more difficult to process and in addition will have a much higher degree of bitter beany soy flavor taste.

Typically the flour will have a moisture content within the range of from about 10% to about 12%.

After preparation of the cereal flour, vitamins and minerals are added to supplement the already existing vitamin and mineral content of the flour. Fortification is sufficient to allow a 100% meeting of the U.S. Department of Agricultural recommended daily allowance level. Prior processing has revealed that one must add more of some vitamins and minerals than required to bring the flour up to the recommended daily level, because during the subsequent cook and extrusion steps, certain vitamins and minerals are lost. Thus, one must compensate for this prior to the cooking by adding excess amounts in order to insure that the USRDA per unit level is in fact achieved after cooking.

For information and guidance in this regard, the amount of added vitamins and minerals for a 300 gram serving, added to the flour prior to cooking, are the following:

Percentage of US RDA
Per Unit Based on 300 gram of Final Product

| | Amount required for US RDA per unit | Amount Added to Invention |
|---|---|---|
| Protein | | |
| Vitamin A | 500 IU* | 2400 |
| Vitamin C (ascorbic acid) | 60 mg. | 312 |
| Thiamine (Vitamin B) | 1.5 mg. | 1.73 |
| Riboflavin (Vitamin B-2) | 1.7 mg | 7.84 |
| Niacin | 20 mg | 88 |
| Calcium | 1000 | 1000 |
| Iron | 18 | 19.1 |
| Vitamin D | 400 IU | 480 |
| Vitamin E | 30 | 68 |
| Vitamin B6 | 2 | 9.2 |
| Folic Acid (Folacin) | .4 | .48 |
| Vitamin B12 | 6 mgc | 7 |
| Phosphorus | 1000 IU | 1000 |
| Iodine | .15 | .243 |
| Magnesium | 400 | 400 |
| Zinc | 15 | 20 |
| Copper | 2 | 15.7 |
| Biotin | .3 | .36 |
| Pantothenic acid | 10 | 11.5 |
| Potassium | 2500 | 2400 |
| Manganese | 2.5 | 3 |

*International Units

The ultimate end product as prepared in accordance with the added percentages expressed above, has the following nutritional data per 300 gram sample:

| NUTRITIONAL INFORMATION | | |
|---|---|---|
| | US RDA | Nutrameal* |
| Calories | 2300–2700 | 1130 |
| Protein gr. | 65 gr. | 65 gr. |
| Carbohydrates gr. | 350 gr. | 231 gr. |
| Fat gr. | 100 gr. | 4 gr. |
| Sodium mg. | (?)– | 183 |

Based on 300 gr. of Nutrameal with a shelf life of one year, the percentages will be equal to or greater than those stated.

After fortification by addition of vitamins and minerals as expressed above, the flour is preferably brought to a moisture level of within the range of from about 17% to about 20%. Experience shows this to be the most successful moisture level for extrusion for the product of this invention. Generally the flour, prior to the addition of water and steam to moisten it in this step, will have a moisture content of from about 10% to about 12%. After moisture addition, there is additional mixing to assure substantial and uniform homogeneity of the product which is now ready for extrusion cooking.

At this point, any desired flavor for the product can be added in appropriate flavoring effective amounts. Suitable flavors which could be added are almost limitless and do not form a part of this invention, but for example, one may add cinnamon flavor, almond, oatmeal, chocolate, curry, bean, no flavor whatsoever, leaving the product plain, chicken flavor, meat flavor, fish flavor, etc. Again, the flavoring will be added depending upon the indigenous ethnic eating habits of the area in which the product is to be consumed. In addition, sweeteners and non-fat dry milk solids may be added.

In the next step of the invention, cooking and gelatinization of the previously described now fortified flour are accomplished. The most convenient way of accomplishing efficient cooking and gelatinization for purposes of this invention is in a cooking-extruding process step. Numerous suitable extruders can be employed, but one with particular success is a Wenger Extruder-Cooker. In accordance with such extrusion cookers, as is known in the art, a screw extruder under controlled temperature and pressure conditions is utilized to simultaneously cook, gelatinize and extrude. The Wenger extruder is a well known example of one which can be used, however, it is conceivable that other extruders such as a Brabender may also be employed. For further details with regard to Wenger extruders, see U.S. Pat. No. 3,117,006, the disclosure of which is incorporated herein by reference.

In accordance with the extrusion cooking process of this invention, the flour, having the content and fineness as previously described, is introduced into the screw conveyor-extruder cooker. The temperature within the extruder suitable for accomplishing the cook and gelatinization of this invention has been found to be within the range of from about 290° F. to about 310° F., with the pressure ranging from about 500 psig to about 1200 psig. Under these conditions, the residence time in the cooker extruder to accomplish the cook and the partial gelatinization is about 15 seconds. It can, of course, vary within the range of, say from about 10 to about 20 seconds. The material which exits from the cooker extruder will have a texture of bread dough like.

At this point, the product can be shaped and dried. Again, one of the advantages of this product is that it can be shaped and dried to an almost limitless number of configurations. Suitable exit extruder dies can be used to make the product in the shape of a conventional, ready-to-eat cereal, the shape of rice, a ground flour, chip or snack food shapes, crouton shapes, textured bits of meat, or the like. The shaped product is thereafter dried down, typically to a moisture content of about 3% by conventional driers, such as oven driers, belt continuous driers, or the like. Suitable tray drying can be accomplished in an oven at 250° F. for about 15 minutes on a moving belt, which will dry down to a moisture content of within the range of 3% to 5%, typically 3%.

The product made in accordance with this invention as described herein, having the content as previously expressed in the table above, has been tested and found to exist in stable but edible and usable form for up to one year without significant deterioration. In addition, the product has a balanced amino acid content, does meet the minimum USRDA requirements, and has been shaped, tasted and acceptably received in snack forms, breakfast cereal forms, bread dough shapes, in porridges, casseroles and the like. Therefore, it has wide flexibility and can be successfully used for nutritional supplementation to prevent malnutrition in a wide variety of places.

It therefore can be seen that the product is very nutritional, convenient, economical and adaptive. It may be served in its existing form as a snack food, with milk as a breakfast cereal, substituting for corn meal or wheat floured breads, adding hot water as a gruel or porridge, adding meats and/or vegetables or included in foods conforming to the conventional basic food needs, desires and eating habits of all cultures and ethnic groups. The variety of applications make it a tremendously nutritional substitute for rice, limited only by the creative ability of the person preparing the food products.

Thus, the invention accomplishes at least all of its stated objectives.

What is claimed is:

1. A process of making a long shelf life, nutrient fortified cereal based food having a substantially neutral flavor said method comprising:

mixing whole not dehulled, defatted or degermed corn and whole not dehulled, defatted or degermed soybeans at a weight ratio of corn to soybeans of from about 65:35 to about 70:30;

milling said corn and soybean mixture to provide a milled flour mixture;

fortifying with vitamin and mineral nutrients, said flour mixture to a level which will allow the ultimate cooked product to meet daily allowance requirements for nutrition;

moistening said flour to a moisture level of from about 17% to about 20% by weight of moisture;

extruder cooking said moistened, fortified flour at a temperature of from about 290° F. to about 310° F., at a pressure of from about 500 psig to about 1200 psig for up to about 15 seconds to cook and gelatinize said flour; and shaping and drying to a moisture content within the range of from about 3% to about 5%.

2. The process of claim 1 wherein the weight ratio of corn to soybeans is 70:30.

3. The process of claim 1 wherein said milling is to a size of from about 20 mesh U.S. sieve screen to through 30 mesh U.S. sieve screen.

4. The process of claim 1 wherein said milling is roller or hammer milling.

5. The product of the process of claim 1.

* * * * *